(12) United States Patent
Kashima et al.

(10) Patent No.: US 6,657,877 B2
(45) Date of Patent: Dec. 2, 2003

(54) POWER SUPPLY CIRCUIT

(75) Inventors: Masato Kashima, Nagano (JP);
Mitsuru Sato, Nagano (JP); Eiji Kuroda, Nagano (JP); Hironobu Shiroyama, Nagano (JP)

(73) Assignee: Fuji Electric Co., Ltd. (JP)

( * ) Notice: Subject to any disclaimer, the term of this patent is extended or adjusted under 35 U.S.C. 154(b) by 199 days.

(21) Appl. No.: 09/966,769

(22) Filed: Sep. 28, 2001

(65) Prior Publication Data

US 2002/0089860 A1 Jul. 11, 2002

(30) Foreign Application Priority Data

Sep. 28, 2000 (JP) ........................................ 2000-296125

(51) Int. Cl.⁷ ............................................. H02M 7/217
(52) U.S. Cl. ........................... 363/127; 363/19; 363/49; 323/284
(58) Field of Search ........................... 363/18, 19, 49, 363/52, 53, 56.09, 56.1, 56.12, 125, 127; 323/235, 284, 285, 901

(56) References Cited

U.S. PATENT DOCUMENTS

| | | | | |
|---|---|---|---|---|
| 4,428,016 A | * | 1/1984 | Brasfield | ................. 323/285 X |
| 4,808,223 A | | 2/1989 | Ozaki et al. | ................... 75/235 |
| 4,866,588 A | * | 9/1989 | Rene | ..................... 363/56.09 X |
| 6,366,070 B1 | * | 4/2002 | Cooke et al. | ................ 323/284 |

* cited by examiner

Primary Examiner—Jessica Han
(74) Attorney, Agent, or Firm—Rossi & Associates

(57) ABSTRACT

A power supply circuit improves the power factor when the load is light, and incorporates a starting circuit for reacting quickly to the changes in the output from the power supply circuit and a short-circuit detecting means for detecting the short-circuit of the feedback signal. The apparatus includes: an error amplifier; a comparator that monitors the output from the error amplifier and generates an offset regulating current $I_{SO}$; a multiplier; a sensing current comparator that compares the output signal from the multiplier and the AC line current and generates a reset signal; a timer that directly monitors the inputted zero-cross signal; and a comparator for short-circuit detection, that facilitates reducing the exterior parts and components.

18 Claims, 5 Drawing Sheets

POWER SUPPLY CIRCUIT

FIELD OF THE INVENTION

The present invention relates to a power supply circuit. More specifically, the present invention relates to a power supply circuit applicable to a control IC for improving the power factor of a self-excited power supply circuit.

BACKGROUND OF THE INVENTION

A power factor control circuit is used in the power supply circuit, that switches on and off a full-wave-rectified AC input voltage to obtain a desired DC output voltage. The power factor control circuit includes an error amplifier, to which a feedback signal indicating the DC output voltage is inputted; a multiplier, to which the output of the error amplifier and an AC input voltage obtained by full-wave-rectification of the commercially supplied electric power are inputted; a sensing current comparator, that compares the output of the multiplier and an AC line current; a transformer, that receives the AC input voltage; a rectifying and smoothing circuit, that generates the DC output voltage; a switching device between the transformer and the rectifying and smoothing circuit; and an RS flip-flop, that controls the switching device. The power factor control circuit improves the power factor by keeping the average of the AC line current sinusoidal based on the full-wave-rectified AC input voltage and in the same phase with the AC input voltage.

When the switching device is ON, the full-wave-rectified AC line current flows to the ground via the switching device. The energy of the current is stored in the transformer. The multiplier determines a peak current value proportional to the AC input voltage and necessary for generating the average of the AC line current. The sensing current comparator compares the determined peak current value and the AC line current with each other. The sensing current comparator generates a reset signal when the AC line current increases to reach the peak current value determined by the multiplier. The reset signal resets the RS flip flop. The reset RS flip flop switches off the switching device. In response to the switching-off of the switching device, the current energy stored in the transformer is fed to the rectifying and smoothing circuit on the output side. The signal from the secondary side of the transformer, the level thereof is high while the switching device is ON, sets the RS flip flop. The set RS flip flop switches the switching device on. By setting and resetting the RS flip flop repeatedly, a current is fed to the rectifying and smoothing circuit on the output side.

Since the peak value of the AC line current is limited to a value proportional to the AC input voltage while the switching current is ON, the wave form of the average AC line current is a sinusoidal one similar to the sinusoidal wave of the AC input voltage.

It is necessary for the power supply circuit to have a starting circuit that facilitates start and restart of the power supply circuit. Usually, the conventional power supply circuit is provided with an exterior starting circuit, that employs an exterior oscillator. However, the exterior oscillator and such exterior parts and components increase the costs of the power supply circuit. Japanese Unexamined Laid Open Patent Application H06-86555 discloses a power supply circuit, that incorporates an interior starting circuit to obviate the above described problem.

The conventional power supply circuit uses a feedback signal obtained by dividing the DC output voltage with resistance. When the feedback signal is low, the power supply circuit boosts the DC output voltage. When the feedback signal is high, the power supply circuit lowers the DC output voltage. Since the power supply circuit works based on the principles as described above, the power supply circuit also boosts the DC output voltage when the feedback signal is short-circuited due to anomalies such as breakdown of the voltage divider for detecting the DC output voltage, causing dangerous states. To prevent such dangerous states, the conventional power supply circuit has an exterior comparator for monitoring the feedback signal. When the feedback signal is below the predetermined level, the output of the error amplifier inputted to the multiplier is set at zero. As a result, the peak value of the output from the multiplier becomes extremely small, resetting the RS flip flop and switching off the switching device.

Since the AC input voltage to the power supply circuit, that controls the power factor, is a full-wave-rectified sinusoidal wave, the AC input voltage is almost zero in the bottom portion of the sinusoidal wave. Therefore, the output voltage from the power supply circuit ought to be zero when the AC input voltage is in the bottom portion thereof. However, the conventional power supply circuit outputs a nonzero current which does not correspond to the zero input voltage, since the sensing current comparator outputs a low current due to the offset voltage outputted from the multiplier or the offset voltage inputted to the sensing current comparator. When the load of the power supply circuit is light, the peak value of the sinusoidal wave of the average current is low. Therefore, especially when the load of the power supply circuit is light, the nonzero current outputted corresponding to the bottom portion of the AC input voltage is troublesome. More specifically, the nonzero output current impairs the power factor.

The conventional power supply circuit, that incorporates a starting circuit, monitors the output of the RS flip flop storing the driving state of the exterior switching device. When the RS flip flop is in the reset state and it outputs for a predetermined period of time, the conventional power supply circuit sets the RS flip flop for restarting. However, a delay to the change of the output from the conventional power supply circuit occurs in the response of the timer circuit.

The conventional power supply circuit has an exterior detector for detecting a short-circuit of the feedback signal. When the exterior detector detects a short-circuit of the feedback signal, the exterior detector stops the conventional power supply circuit. These exterior parts and components increase the costs of the self-excited power supply circuit.

In view of the foregoing, it is an object of the invention to provide a power supply circuit that facilitates improving the power factor when the load of the power supply circuit is light.

It is another object of the invention to provide a power supply circuit that does not have any exterior parts and components for starting and restarting but incorporates a starting circuit that reacts quickly to the changes of the output from the power supply circuit.

It is still another object of the invention to provide a power supply circuit that facilitates reducing the parts and components for detecting the short-circuit of the feedback signal.

SUMMARY OF THE INVENTION

According to an embodiment of the invention, there is provided a power supply circuit, the power supply circuit switching on and off a full-wave-rectified AC input voltage to obtain a desired DC output voltage, the power supply circuit including: a power factor control circuit, the power factor control circuit keeping the average of an AC line current sinusoidal based on the full-wave-rectified AC input voltage and in the same phase with the AC input voltage.

Preferably, the power factor control circuit includes an offset regulating current generator, that generates an offset regulating current when the load of the power supply circuit is light; and a sensing current comparator, that compares a signal proportional to the AC input voltage and a signal indicating an AC line current to generate a reset signal, and cancels the offset voltage inputted thereto based on the offset regulating current inputted from the offset regulating current generator.

The power supply circuit having the structure described above, that includes an offset regulating current generator for generating an offset regulating current when the load of the power supply circuit is light and a sensing current comparator for canceling the offset voltage inputted thereto based on the offset regulating current inputted from the offset regulating current generator, facilitates correcting the output characteristics thereof when the load is light and improving the power factor.

Preferably, the power factor control circuit further includes a timer, that monitors a zero-cross signal and outputs a start signal or a restart signal when the zero-cross signal is not detected for a certain period of time, an RS flip flop, that outputs an ON-OFF signal for switching on and off the switching device of the power supply circuit, and an OR gate, that outputs a signal indicating the logical sum of the start signal or the restart signal from the timer and the ON-OFF signal from the RS flip flop.

The starting circuit for the power supply circuit, having the structure as described above, does not need any exterior parts and components, and it facilitates quick response to the changes of the output from the power supply circuit.

Preferably, the power factor control circuit further includes a short-circuit detection circuit, that monitors the feedback signal and outputs a short-circuit detection signal when the feedback signal is lower than a predetermined value, and an AND gate, that interrupts the ON-OFF signal for switching on and off the switching device of the power supply circuit based on the short-circuit detection signal inputted from the short-circuit detection circuit.

It is not necessary for the power supply circuit, having the structure as described above, to employ any exterior starting circuit.

BRIEF DESCRIPTION OF THE DRAWINGS

The invention will be described with reference to the accompanying drawings, wherein.

DETAILED DESCRIPTION OF THE PREFERRED EMBODIMENTS

Now the invention will be explained hereinafter with reference to the accompanied drawing figures which illustrate the preferred embodiments of the invention.

Figure 1:
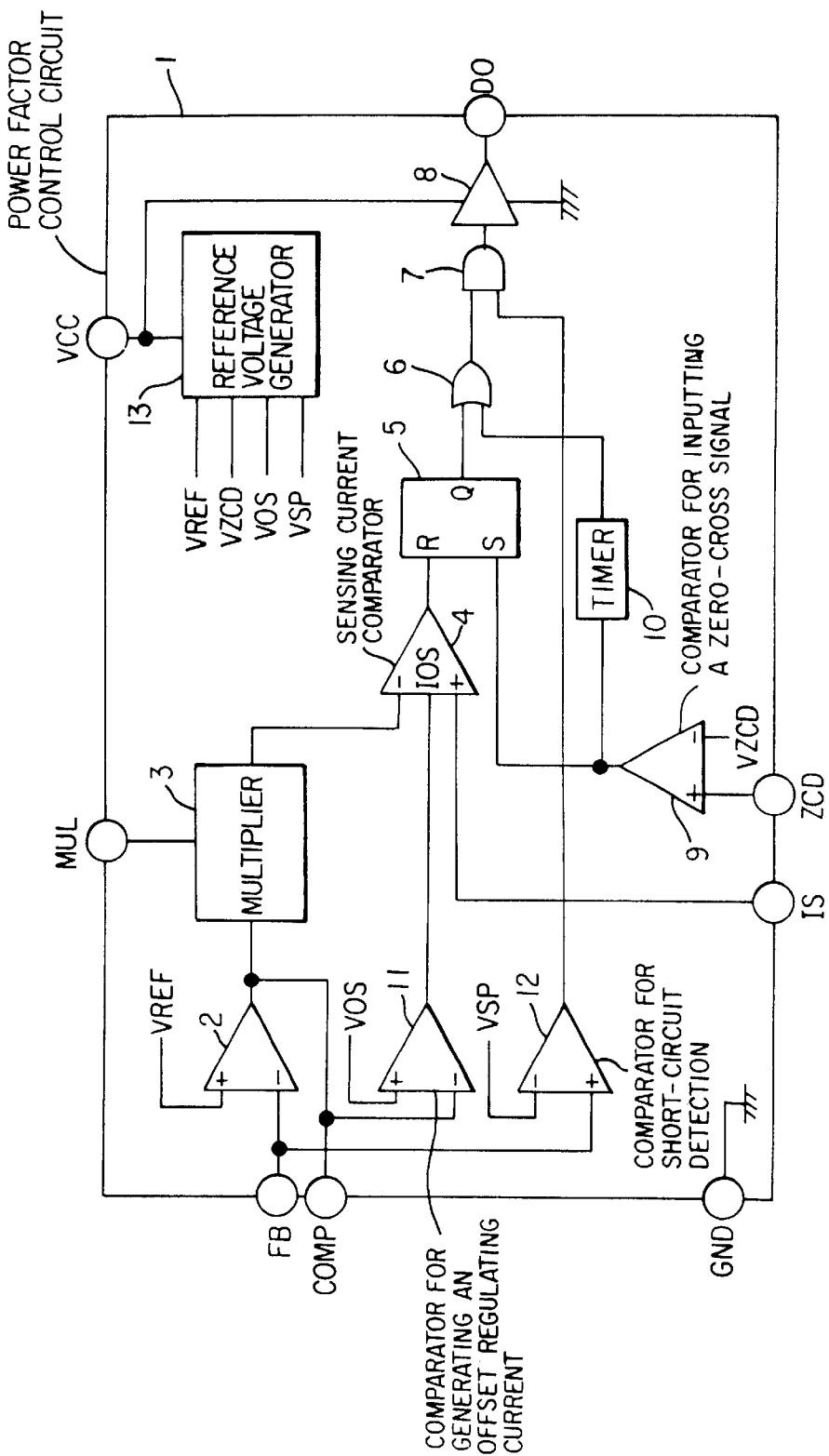
FIG. 1 is a functional block diagram of a power factor control circuit according to the invention.

FIG. 1 is a functional block diagram of a power factor control circuit according to the invention. The power factor control circuit 1 is an integrated circuit (IC), that integrates all the necessary functions into a chip. The power factor control circuit 1 includes a VCC terminal for inputting the power supply voltage, a GND terminal for connecting to the ground, an MUL terminal for inputting a voltage proportional to the AC input voltage, an FB terminal for inputting a feedback signal, a COMP terminal for inputting an error signal, an IS terminal for inputting a sensing current signal, a ZCD terminal for inputting a zero-cross signal, and a DO terminal for outputting.

The power factor control circuit 1 includes an error amplifier 2, the non-inverting input terminal thereof is connected to a reference voltage $V_{REF}$ and the inverting input terminal thereof to the FB terminal. The output from the error amplifier 2 is connected to the COMP terminal and the first input terminal of a multiplier 3. The second input terminal of the multiplier 3 is connected to the MUL terminal and the output from the multiplier 3 is connected to the inverting input terminal of a sensing current comparator 4. The non-inverting input terminal of the sensing current a comparator 4 is connected to the IS terminal and the output from the sensing current comparator 4 is connected to the reset input terminal of an RS flip flop 5. The output from the RS flip flop 5 is connected to the first input terminal of an OR gate 6. The output from the OR gate 6 is connected to the first input terminal of an AND gate 7. The output from the AND gate 7 is connected to the input terminal of a driver 8. The output from the driver 8 is connected to the DO terminal, that is the output terminal of the power factor control circuit 1.

The power factor control circuit 1 includes a comparator 9 for receiving the zero-cross signal. The comparator 9 has a non-inverting input terminal connected to the ZCD terminal and an inverting input terminal, thereto a reference voltage $V_{ZCD}$ is connected. The output from the comparator 9 is connected to the set terminal of the RS flip flop 5 and the input terminal of a timer 10. The output from the timer 10 is connected to the second input terminal of the OR gate 6. The power factor control circuit 1 includes a comparator 11 for generating an offset regulating current and a comparator 12 for short-circuit detection. The comparator 11 has a non-inverting input terminal for receiving a reference voltage $V_{OS}$, an inverting input terminal, to which the output from the error amplifier 2 is connected, and an output terminal connected to the IOS terminal of the sensing current comparator 4 for inputting the offset regulating current. The comparator 12 has an inverting input terminal for receiving a reference voltage $V_{SP}$, a non-inverting input terminal connected to the FB terminal, and an output terminal connected to the second input terminal of the AND gate 7. The power factor control circuit 1 further includes a reference voltage generator 13, that generates the reference voltages $V_{REF}$, $V_{ZCD}$, $V_{OS}$ and $V_{SP}$ based on the voltage inputted to the VCC terminal.

At the start, the zero-cross signal is not inputted to the ZCD terminal. Therefore, the level of the output from the comparator 9 for receiving the zero-cross signal is low. The timer 10 starts operating from this instance and outputs an output signal which is gradually increasing. As soon as the output signal from the timer 10 exceeds the threshold operating voltage for the OR gate 6, the OR gate 6 outputs a high level signal. Since the feedback signal is inputted to the FB terminal immediately after the power factor control circuit 1 starts operating, the comparator 12 for short-circuit detection outputs a high level signal. Based on these operations, the AND gate 7 outputs a high level signal, and the driver 8 outputs a start signal for driving the switching device and switches on the switching device.

An AC line current flows as a result of the switching-on of the switching device. As a result, the voltage signal proportional to the AC line current at the IS terminal rises. As soon as the voltage signal at the IS terminal becomes equal to the peak voltage value, the sensing current comparator 4 outputs a reset signal to switch off the switching device. The operations described above are repeated.

As described above, the timer 10 directly monitors the output of the power factor control circuit 1. If the output from the power factor control circuit 1 keeps the OFF-state thereof for a certain period of time, the timer 10 will bring the output from the power factor control circuit 1 to the ON-state thereof. Thus, an exterior starting circuit is not used, and an interior starting circuit, that facilitates quick response to the change of the output from the power factor control circuit 1, is constructed.

Now the operation of sensing current comparator 4 and the comparator 11 for generating an offset regulating current will be described in detail below.

Figure 2:
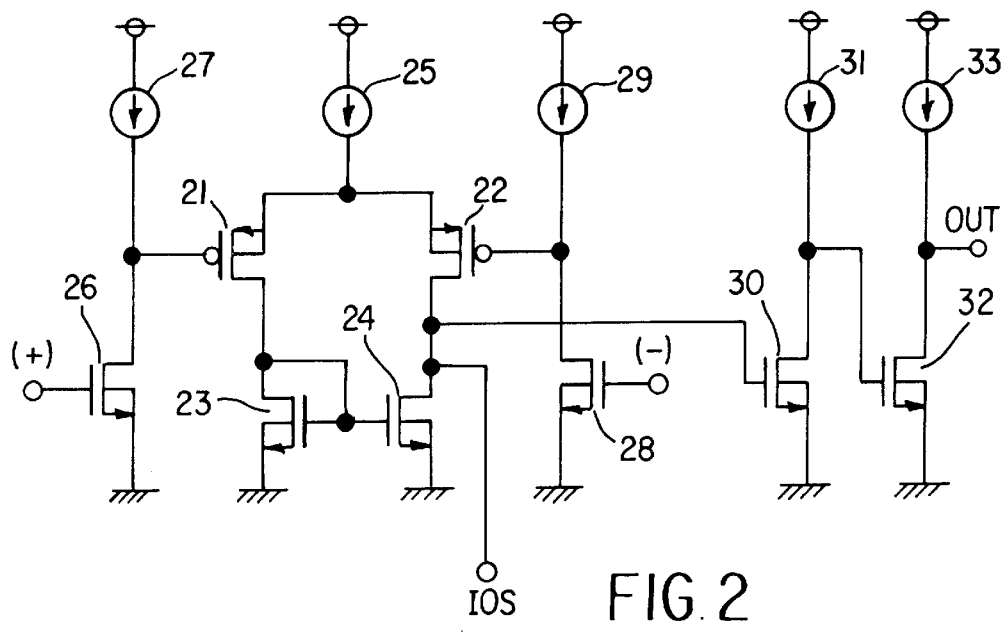
FIG. 2 is a circuit diagram of the sensing current comparator in FIG. 1 according to the invention.
Figure 3:
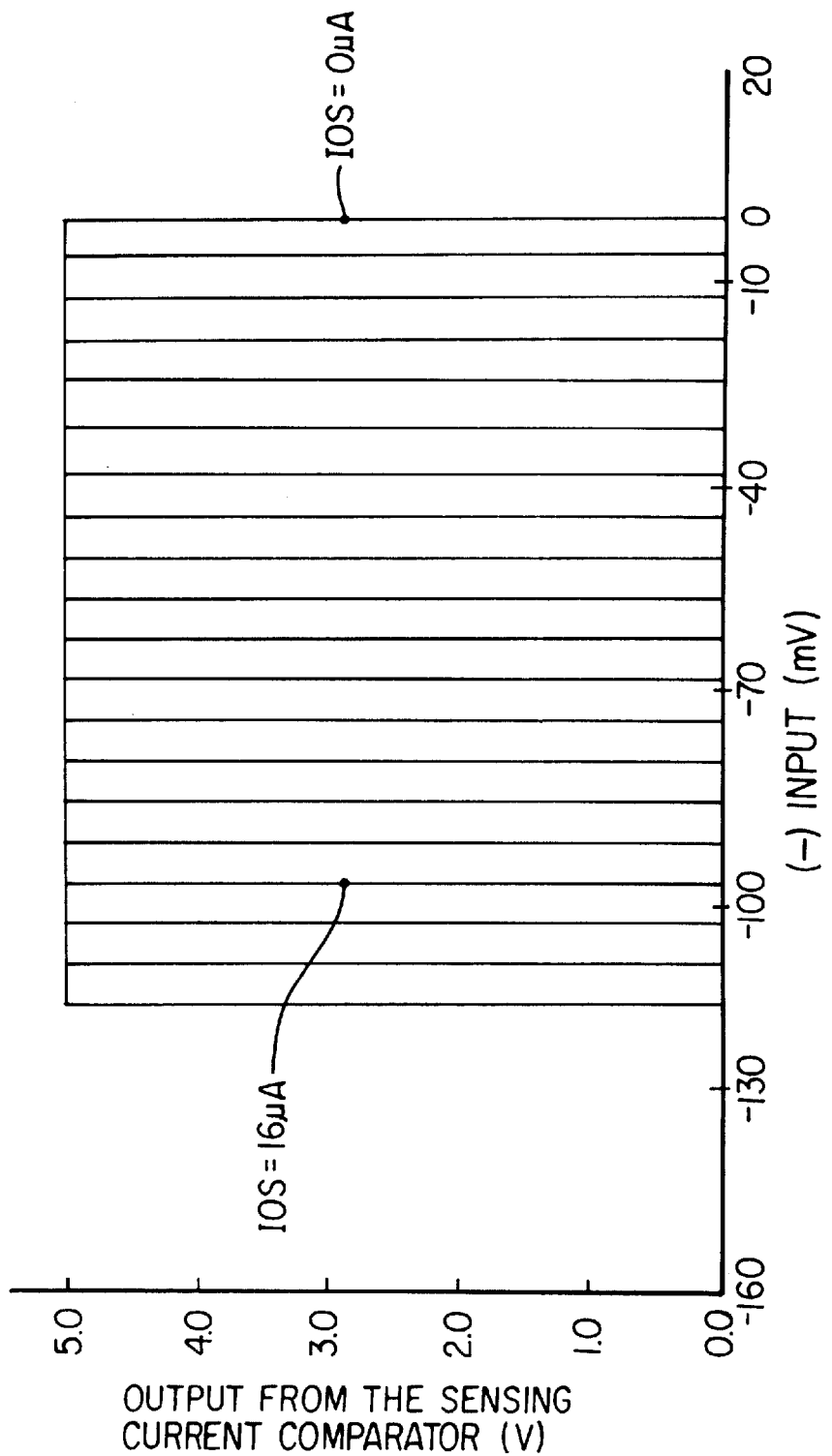
FIG. 3 is a chart showing the input-output characteristics of the sensing current comparator of FIG. 2 at the offset regulating operation.

FIG. 2 is a circuit diagram of the sensing current comparator 4 according to the invention. FIG. 3 is a chart showing the input-output characteristics of the sensing current comparator 4 of FIG. 2 in the offset regulating operation thereof. The sensing current comparator 4 includes four transistors 21 through 24 and a current supply 25 constituting a differential input stage; transistors 26, 28 and current supplies 27 and 29 constituting a source-follower level shifter; and transistors 30, 32 and current supplies 31 and 33 constituting an output buffer.

The IOS terminal for inputting the offset regulating current is disposed for the dynamic load of the transistor 22 on the side of the inverting input terminal. The sensing current comparator 4 having the configurations described above is a comparator, that facilitates regulating the offset voltage inputted thereto based on the offset regulating current injected thereto.

The source-follower level shifter formed of the transistors 26 and 28 is disposed in the input stage to expand the input range to the ground level. By virtue of the source-follower level shifter, the inverting input terminal of the sensing current comparator 4 facilitates detecting the input of the sensing current to the IS terminal from the ground level thereof. As described in FIG. 3, the output from the sensing current comparator 4 is inverted across the zero inverted input thereto when the offset regulating current $I_{OS}$ is not inputted. The input offset voltage increases toward the negative side with increasing input of the offset regulating current $I_{OS}$.

Figure 4:
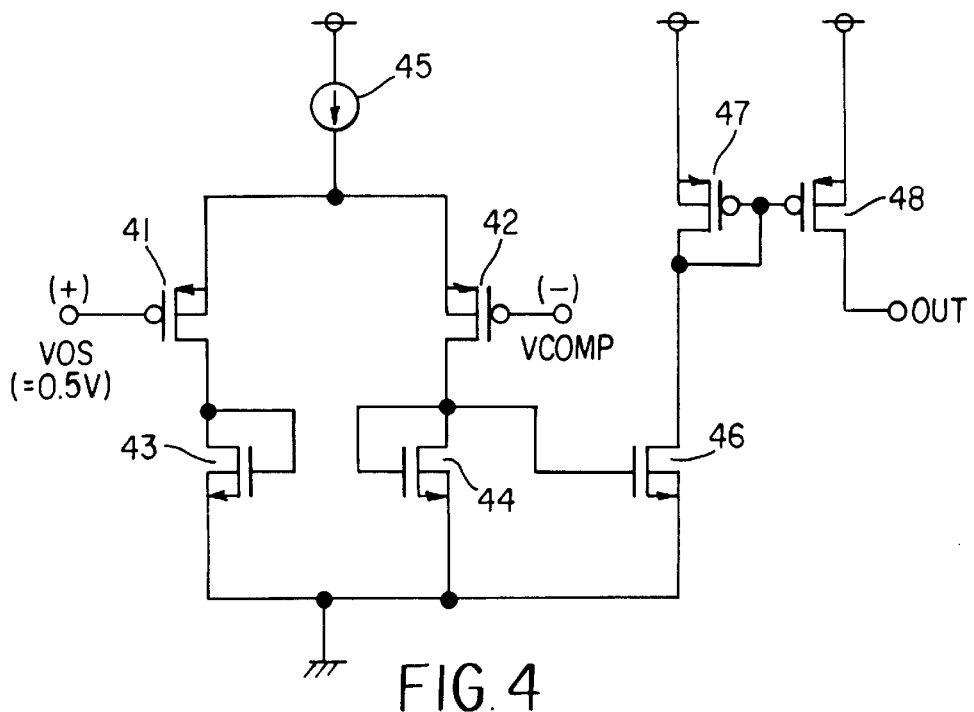
FIG. 4 is a circuit diagram of a comparator for generating an offset regulating current according to the invention.
Figure 5:
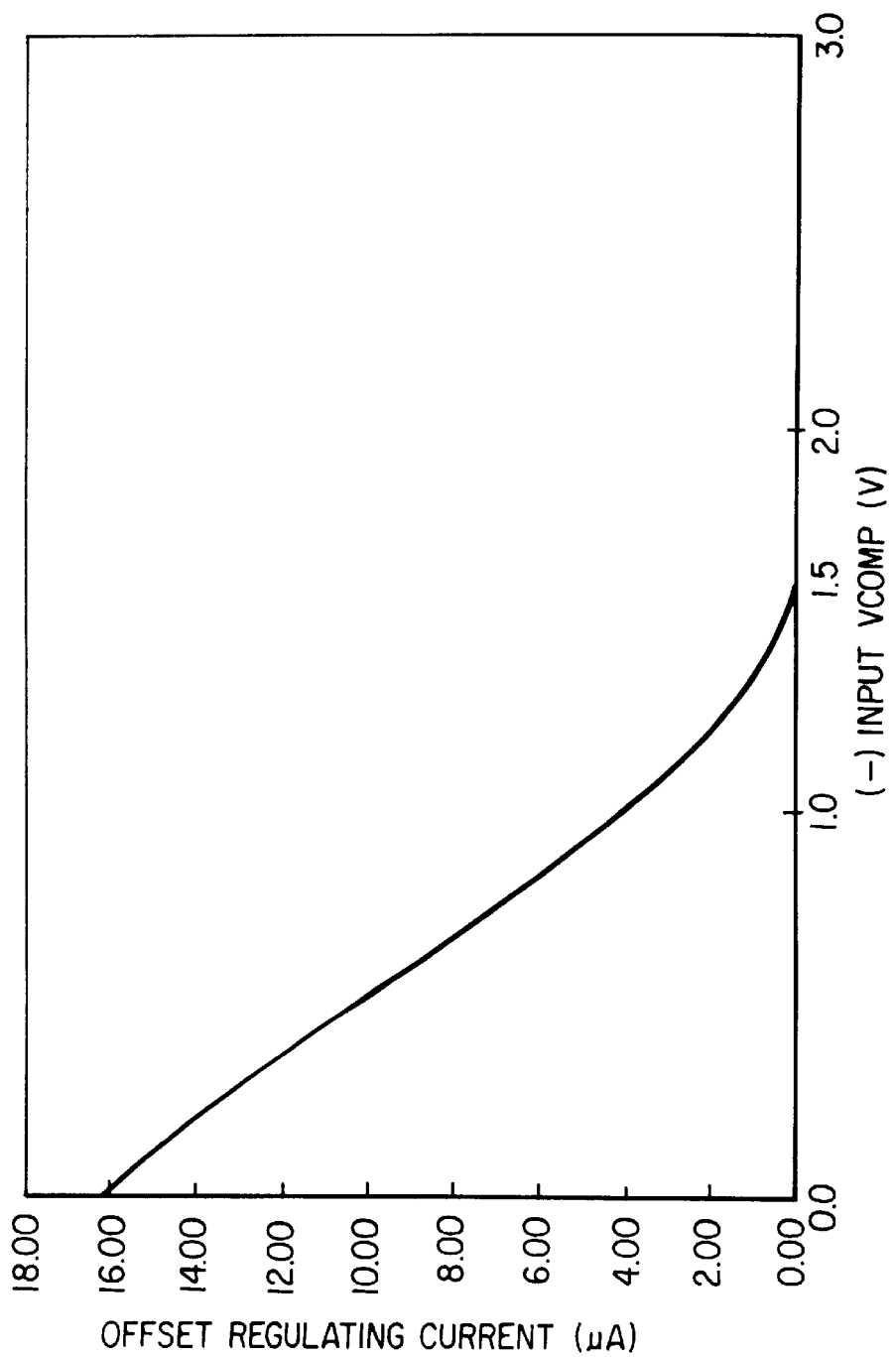
FIG. 5 is a curve showing the input-output characteristics of the comparator of FIG. 4.

FIG. 4 is a circuit diagram of the comparator 11 for generating an offset regulating current according to the invention. FIG. 5 is a curve showing the input output characteristics of the comparator 11 for generating an offset regulating current shown in FIG. 4. The comparator 11 for generating an offset regulating current includes transistors 41 through 44 and a current supply 45 constituting a differential input stage; a transistor 46 constituting a current mirror circuit together with the dynamic load on the inverted input side; and transistors 47, 48 constituting a current mirror circuit in the output stage. The non-inverting input terminal of the comparator 11 receives the reference voltage $V_{OS}$ (preferably 0.5 V) and the inverting input terminal of the comparator 11 receives the voltage $V_{COMP}$ at the COMP terminal, that is the output of the error amplifier 2.

The comparator 11 for generating an offset regulating current uses the transistor 44 connected to act as a diode for the dynamic load in the differential stage and reflects the current through the dynamic load connected to act as a diode with the current mirror circuit to feed a source current. As described in FIG. 5, the comparator 11 constructed as described does not output any offset regulating current $I_{OS}$ when the voltage $V_{COMP}$ is 1.5 V or higher but outputs an offset regulating current $I_{OS}$ when the load is light, therein the voltage $V_{COMP}$ is lower than 1.5 V.

When the load is light, the power factor control circuit 1 operates in the following manner.

Since the feedback signal value inputted to the FB terminal is large when the load is light, the level of the output from the error amplifier lowers and the voltage $V_{COMP}$ at the COMP terminal decreases almost to zero. As the input-output characteristics described in FIG. 5 indicate, the comparator 11 monitoring the voltage $V_{COMP}$ at the COMP terminal judges that the load is light when the $V_{COMP}$ at the COMP terminal is lower than 1.5 V and generates an offset regulating current corresponding to the voltage $V_{COMP}$ at the COMP terminal.

The sensing current comparator 4 regulates the offset voltage inputted thereto based on the offset regulating current $I_{OS}$ inputted to the IOS terminal thereof. As the input-output characteristics described in FIG. 3 indicate, the offset voltage inputted to the sensing current comparator 4 is set at −100 mV for the offset regulating current $I_{OS}$ of 16 $\mu$A inputted to the IOS terminal of the sensing current comparator 4. This −100 mV is determined based on that the sum of the worst case value of the offset voltage outputted from the multiplier 3 and worst case value of the offset voltage inputted to the sensing current comparator 4 is around 100 mV. Since the offset voltage outputted from the multiplier 3 is inputted to the comparator 4, the change in the offset voltage outputted from the multiplier 3 finally causes change of the offset voltage inputted to the comparator 4. Therefore, the offset voltage outputted from the multiplier 3 is not canceled but only the offset voltage inputted to the sensing current comparator 4 is adjusted.

As described above, the output voltage is set at zero when the input voltage is zero in the light load state by inputting the offset regulating current $I_{OS}$ of 16 $\mu$A at the maximum to adjust the offset voltage inputted to the comparator 4 by 100 mV. Thus, the power factor is improved.

As described earlier, the power factor control circuit 1 includes the comparator 12 for short-circuit detection, that monitors the feedback signal fed to the FB terminal. The comparator 12 receives the reference voltage $V_{SP}$ of 0.3 V for short-circuit detection at the inverting input terminal thereof. When the feedback signal is equal to or higher than the reference voltage for short-circuit detection corresponding to the DC output voltage equal to or higher than a predetermined value, the comparator 12 outputs a high-level signal. When the feedback signal is lower than the reference voltage due to a short-circuit fault of the voltage divider and such a fault, the comparator 12 outputs a short-circuit protection signal at a low level. When the comparator 12 outputs a short-circuit protection signal, the level of the output from the AND gate 7 becomes low, interrupting the input to the driver 8.

The power factor control circuit 1 constructed as described above is applicable to a self-excited-type power supply circuit as described below.

Figure 6:
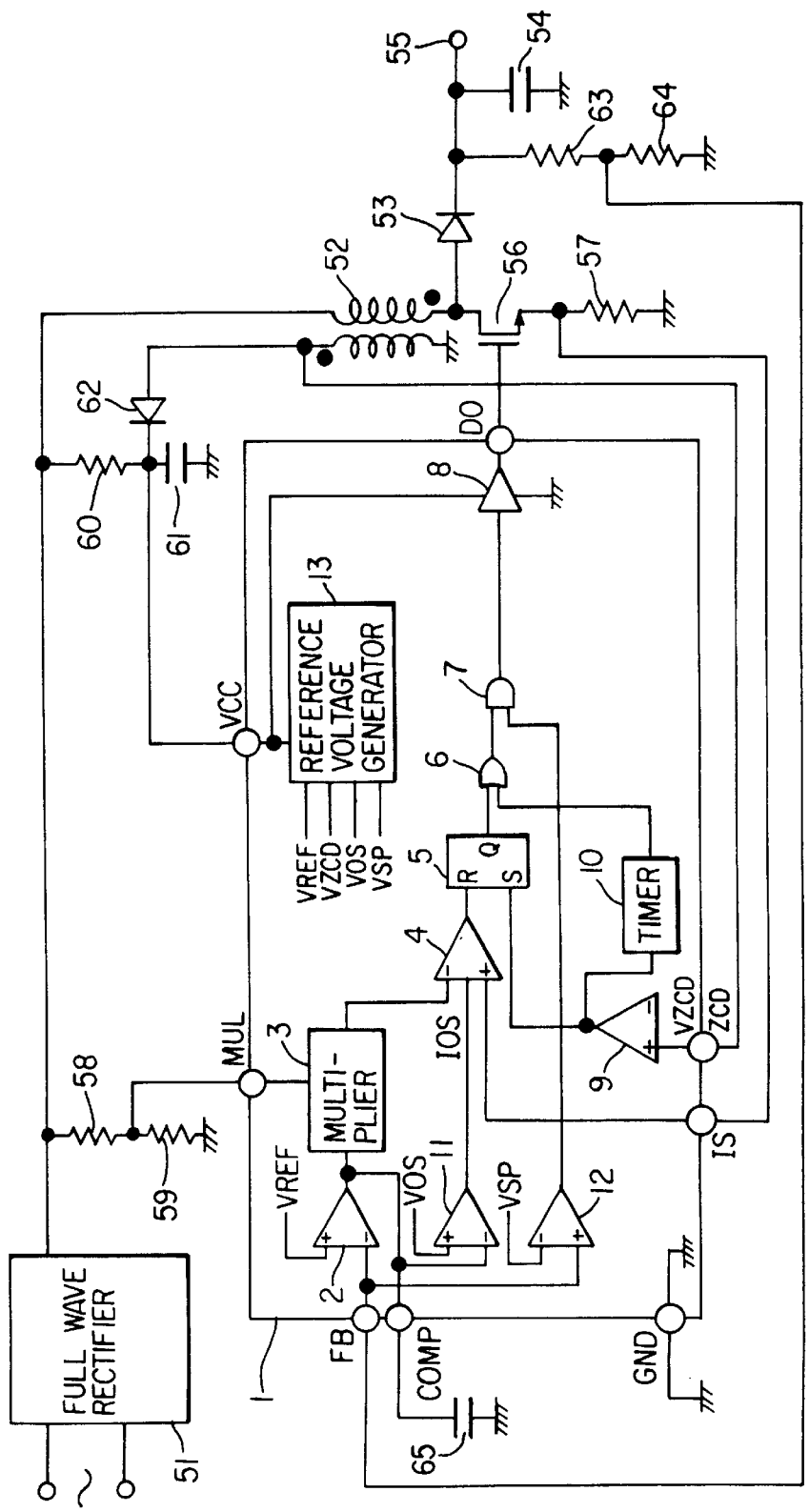
FIG. 6 is a circuit diagram of a self-excited-type power supply circuit according to the invention.

FIG. 6 is a circuit diagram of a self-excited-type power supply circuit according to the invention. The self-excited-type power supply circuit according to the invention includes a full wave rectifier 51, that rectifies the full wave of the commercial power supply. The output from the full wave rectifier 51 is connected to the first end of the primary winding of a transformer 52. The second end of the primary winding of the transformer 52 is connected via a rectifying and smoothing circuit formed of a diode 53 and a capacitor 54 to an output terminal 55 for outputting a DC output voltage. The second end of the primary winding of the transformer 52 is connected also to the drain of an output transistor 56, that works as a switching device. The source of the output transistor 56 is connected to the ground via a resistor 57 for current detection. The gate of the output transistor 56 is connected to the DO terminal of the power factor control circuit 1. The common connection point of the source of the transistor 56 and the resistor 57 is connected to the IS terminal of the power factor control circuit 1.

A voltage divider formed of a resistor 58 and a resistor 59 is connected between the output of the full wave rectifier 51 and the ground. The output from the voltage divider is connected to the MUL terminal of the power factor control circuit 1. The output from the full wave rectifier 51 is connected to the ground via a resistor 60 and a capacitor 61. The common connection point of the resistor 60 and the capacitor 61 is connected to the VCC terminal of the power factor control circuit 1. The common connection point of the resistor 60 and the capacitor 61 is connected also to the first end of the secondary winding of the transformer 52 via a diode 62. The second end of the secondary winding of the transformer 52 is connected to the ground. The first end of the secondary winding of the transformer 52 is connected to the ZCD terminal of the power factor control circuit 1.

A voltage divider is formed of a resistor 63 and a resistor 64 is connected between the output terminal 55 and the ground. The output from the voltage divider is connected to the FB terminal of the power factor control circuit 1. The COMP terminal of the power factor control circuit 1 is connected to a capacitor 65. The GND terminal of the power factor control circuit 1 is connected to the ground.

When the commercial power supply is fed to the self-excited-type power supply circuit, the timer 10 in the power factor control circuit 1 starts operating and outputs a drive signal for switching on the output transistor 56, after a predetermined period of time has elapsed, to switch on the output transistor 56. As the transistor 56 is switched on, the full-wave-rectified AC line current flows through the transistor 56 to the ground. The energy of the AC line current is stored in the transformer 52. The sensing current comparator 4 compares the AC line current detected by the current detecting resistor 57 and the peak current value proportional to the AC input voltage from the multiplier 3. As soon as the AC line current becomes equal to the peak current value proportional to the AC input voltage, the RS flip flop 5 is reset and the output transistor 56 is switched off.

As a result of the switching off of the output transistor 56, the current energy stored in the transformer 52 is fed to the capacitor 54 via the diode 53. While the output transistor 56 is OFF, the level of the zero-cross signal from the secondary winding of the transformer 52 is high. As soon as the zero-cross signal level is high, in excess of the reference voltage $V_{ZCD}$, the RS flip flop 5 is reset, and the reset RS flip flop 5 switches on the output transistor 56. By repeatedly switching on and off the output transistor 56, the DC output voltage smoothed by the capacitor 54 and then it is outputted from the output terminal 55.

When the load of the self-excited-type power supply circuit is light, the feedback signal of the DC output voltage detected by the resistor 63 and the resistor 64 is high. When the feedback signal is high, the output voltage from the error amplifier 2 becomes low, and the terminal voltage of the capacitor 65 lowers below 1.5 V. As the terminal voltage of the capacitor 65 exceeds 1.5 V toward the lower side, the comparator 11 for generating an offset regulating current feeds the offset regulating current to the sensing current comparator 4 to shift the inputted offset voltage to the negative side so that the offset voltage inputted to the comparator 11 may be canceled. By canceling offset voltage inputted to the comparator 11, the power factor is improved.

The comparator 12 for short-circuit detection monitors the feedback signal which is inputted to the FB terminal. When the voltage of the feedback signal is lower than 0.3 V, the comparator 12 judges that the input to the FB terminal is short-circuited and switches off the output transistor 56.

As described above, the power supply circuit according to the invention is constructed such that the offset voltage inputted to the sensing current comparator is shifted to the negative side when the load is light. The structure of the power supply circuit according to the invention facilitates canceling the positive offset voltage inputted to the sensing current comparator and improving the power factor.

The timer incorporated into the power supply circuit monitors the zero-cross signal. When the level of the zero-cross signal is low due to the OFF of the output for a certain period of time, the output transistor is switched on. This structure does not need any exterior parts and components for starting. The starting circuit according to the invention facilitates quick response to the change of the output from the power supply circuit.

The comparator according to the invention for short-circuit detection monitors the feedback signal of the DC output voltage. The comparator, that monitors the feedback signal of the DC output voltage, does not require an exterior circuit for short-circuit detection, and thus the amount of exterior parts and components are reduced.

What is claimed is:

1. A power supply circuit for switching on and off a full-wave-rectified AC input voltage to obtain a desired DC output voltage comprising.

an offset regulating current generator, that generates an offset regulating current when a load of the power supply circuit is light; and a sensing current comparator, that compares a signal proportional to the AC input voltage and a signal indicating an AC input line current to generate a reset signal, and cancels an offset voltage inputted into the sensing current comparator based on the offset regulating current.

2. The power supply circuit according to claim 1, wherein the power supply circuit functions as a power factor control circuit which keeps the average of the AC line current sinusoidal based on the full-wave-rectified AC input voltage and keeps the AC line current in the same phase as the AC input voltage.

3. The power supply circuit according to claim 1, further comprising an error amplifier that amplifies a feedback signal proportional to the DC output voltage, wherein the offset regulating current generator monitors an output signal from the error amplifier and generates the offset regulating current when the load is light, and wherein the output signal from the error amplifier is lower than a predetermined value.

4. The power supply circuit according to claim 3, wherein the offset regulating current generator includes:
  a differential input circuit, that includes a dynamic load connected to act as a diode; and
  a current mirror circuit, that outputs the offset regulating current from the dynamic load on a side of an inverting input terminal of the differential input circuit when an inverted input of the differential input circuit is lower than a non-inverted input of a predetermined reference voltage.

5. The power supply circuit according to claim 1, wherein the sensing current comparator includes a differential input circuit comprising a dynamic load on a side of an inverting input terminal of the differential input circuit, an output buffer circuit, and an input terminal, wherein the offset regulating current is inputted at a connection point of the dynamic load and the output buffer circuit.

6. The power supply circuit according to claim 1 further comprising:
  a timer, that monitors a zero-cross signal and outputs a start signal or a restart signal when the zero-cross signal is not detected for a certain period of time;
  an RS flip flop, that outputs an ON-OFF signal for switching on and off a switching device of the power supply circuit; and
  an OR gate, that outputs a signal indicating the logical sum of the start signal or the restart signal from the timer and the ON-OFF signal from the RS flip flop.

7. The power supply circuit according to claim 1, further comprising:
  a short-circuit detection circuit, that monitors a feedback signal and outputs a short-circuit detection signal when the feedback signal is lower than a predetermined value, and
  an AND gate, that interrupts an ON-OFF signal for switching on and off a switching device of the power supply circuit based on the short-circuit detection signal inputted from the short-circuit detection circuit.

8. A power supply circuit, for switching on and off a full-wave-rectified AC input voltage, to obtain a desired DC output voltage, comprising:
  an offset regulating current generator, the offset regulating current generator generating an offset regulating current when a load of the power supply circuit is light;
  a sensing current comparator, the sensing current comparator comparing a signal proportional to the AC input voltage and a signal indicating an AC line current, whereby to generate a reset signal, the sensing current comparator cancels an offset voltage inputted thereto based on the offset regulating current inputted from the offset regulating current generator;
  a timer, the timer monitoring a zero-cross signal, the timer outputting a start signal or a restart signal when the zero-cross signal is not detected for a certain period of time;
  an RS flip flop, the RS flip flop outputting an ON-OFF signal for switching on and off a switching device of the power supply circuit;
  an OR gate, the OR gate outputting a signal indicating a logical sum of the start signal or the restart signal from the timer and the ON-OFF signal from the RS flip flop;
  a short-circuit detection circuit, the short-circuit detection circuit monitoring a feedback signal proportional to the DC output voltage, the short-circuit detection circuit outputting a short-circuit detection signal when the feedback signal is lower than a predetermined value; and
  an AND gate, the AND gate interrupting the ON-OFF signal based on the short-circuit detection signal inputted from the short-circuit detection circuit.

9. The power supply circuit according to claim 8, wherein the power supply circuit functions as a power factor control circuit keeping the AC line current sinusoidal based on the full-wave-rectified AC input voltage and keeping the AC line current in the same phase with the AC input voltage.

10. A method for controlling a power supply circuit comprising:
  switching on and off a full-wave-rectified AC input voltage to obtain a desired DC output voltage;
  generating an offset regulating current when a load of the power supply circuit is light;
  comparing a signal proportional to the AC input voltage and a signal indicating an AC input line current to generate a reset signal, utilizing a sensing current comparator; and
  canceling an offset voltage based on the offset regulating current.

11. The method for controlling a power supply circuit according to claim 10, wherein the power supply circuit functions as a power factor control circuit which keeps the average of the AC line current sinusoidal based on the full-wave-rectified AC input voltage and keeps the AC line current in the same phase as the AC input voltage.

12. The method for controlling a power supply circuit according to claim 10, further comprising:
  amplifying a feedback signal proportional to the DC output voltage, utilizing an error amplifier; and
  monitoring an output signal from the error amplifier and generating the offset regulating current when the load is light, utilizing an offset regulating current generator; wherein the output signal from the error amplifier is lower than a predetermined value.

13. The method for controlling a power supply circuit according to claim 12, wherein the offset regulating current generator includes:
  a differential input circuit, that includes a dynamic load connected to act as a diode; and
  a current mirror circuit, that outputs the offset regulating current from the dynamic load on a side of an inverting input terminal of the differential input circuit when an inverted input of the differential input circuit is lower than a non-inverted input of a predetermined reference voltage.

14. The method for controlling a power supply circuit according to claim 10, wherein the sensing current comparator comprises includes a differential input circuit comprising a dynamic load on a side of an inverting input terminal of the differential input circuit, an output buffer circuit, and an input terminal, wherein the offset regulating current is inputted at a connection point of the dynamic load and the output buffer circuit.

15. The method for controlling a power supply circuit according to claim 10, further comprising:
  monitoring a zero-cross signal; and
  outputting a start signal or a restart signal when the zero-cross signal is not detected for a certain period of time;
  outputting an ON-OFF signal for switching on and off a switching device of the power supply circuit; and outputting a signal indicating the logical sum of the start signal or the restart signal and the ON-OFF signal.

16. The method for controlling a power supply circuit according to claim 10, further comprising:

monitoring a feedback signal and outputting a short-circuit detection signal when the feedback signal is lower than a predetermined value; and interrupting an ON-OFF signal for switching on and off a switching device of the power supply circuit based on the short-circuit detection signal.

17. A method for controlling a power supply circuit which switches on and off a full-wave-rectified AC input voltage to obtain a desired DC output voltage comprising:

generating an offset regulating current when a load of the power supply circuit is light;

comparing a signal proportional to the AC input voltage and a signal indicating an AC line current to generate a reset signal, and canceling an offset voltage based on the offset regulating current;

monitoring a zero-cross signal;

outputting a start signal or a restart signal, when the zero-cross signal is not detected for a certain period of time;

outputting an ON-OFF signal for switching on and off a switching device of the power supply circuit;

outputting a signal which indicates a logical sum of the start signal or the restart signal and the ON-OFF signal;

monitoring a feedback signal proportional to the DC output voltage and outputting a short-circuit detection signal when the feedback signal is lower than a predetermined value; and interrupting the ON-OFF signal based on the short-circuit detection signal.

18. The method for controlling a power supply circuit according to claim 17, wherein the power supply circuit functions as a power factor control circuit keeping the AC line current sinusoidal based on the full-wave-rectified AC input voltage and keeping the AC line current in the same phase with the AC input voltage.

* * * * *